United States Patent
Wu (10) Patent No.: US 8,905,653 B2
(45) Date of Patent: Dec. 9, 2014

(54) ADAPTER TRANSMITTING WITH ELECTRICAL AND OPTICAL SIGNALS

(75) Inventor: Jerry Wu, Irvine, CA (US)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 483 days.

(21) Appl. No.: 13/285,160

(22) Filed: Oct. 31, 2011

(65) Prior Publication Data

US 2012/0106901 A1    May 3, 2012

(30) Foreign Application Priority Data

Nov. 1, 2010   (CN) .......................... 2010 2 0587013

(51) Int. Cl.
*G02B 6/36*     (2006.01)
*H01R 31/06*   (2006.01)
*G02B 6/38*     (2006.01)

(52) U.S. Cl.
CPC ............ *H01R 31/06* (2013.01); *H01R 2201/06* (2013.01); *G02B 6/3817* (2013.01); *G02B 6/3825* (2013.01)
USPC .......................................................... 385/93

(58) Field of Classification Search
USPC ................................................ 385/14, 33, 93
See application file for complete search history.

(56) References Cited

U.S. PATENT DOCUMENTS

| 6,364,713 | B1 | 4/2002 | Kuo |
| 7,572,071 | B1 * | 8/2009 | Wu ................................ 385/94 |
| 7,651,379 | B1 | 1/2010 | Wu |

* cited by examiner

*Primary Examiner* — Uyen Chuan N Le
*Assistant Examiner* — Chad Smith
(74) *Attorney, Agent, or Firm* — Wei Te Chung; Ming Chieh Chang (57) ABSTRACT

An adapter includes a plug connector having a first housing defining a first mating port and a plurality of first terminals disposed in the first housing, and a receptacle connector having a second housing defining a second mating port and a plurality of second terminals disposed in the second housing and electrically connecting to the first terminals. An optical device has a first optical module and a second optical module optically connecting with each other via optical fibers. The first optical module is movably retained in the first housing while the second optical module is immovably retained in the second housing along a mating direction of the receptacle connector.

15 Claims, 6 Drawing Sheets

ADAPTER TRANSMITTING WITH ELECTRICAL AND OPTICAL SIGNALS

BACKGROUND OF THE INVENTION

1. Field of the Invention

The present invention relates to an adapter, and more particularly to an adapter adapted for transmitting electrical and optical signals.

2. Description of Related Art

Nowadays, adapters have been very popular for interconverting electrical connectors of different protocols so as to make it possible for electrically connecting different kinds of electronic devices having diverse interfaces such as USB, SATA, HDMI, DVI, and so on. However, optical signal transmitting also has been gradually widely used and incorporated into the electrical connectors, so that the electrical connectors could offer both electrical and optical signals transmitting, however no adapter has been designed for converting both electrical and optical transmitting.

Hence, an adapter used for transmitting both electrical and optical signals is desired to overcome the above problems.

BRIEF SUMMARY OF THE INVENTION

According to one aspect of the present invention, an adapter comprises: a plug connector comprising a first housing defining a first mating port, and a plurality of first terminals disposed in the first housing; a receptacle connector comprising a second housing defining a second mating port, and a plurality of second terminals disposed in the second housing and electrically connecting to the first terminals; and an optical device comprising a first optical module and a second optical module optically connecting with each other via optical fibers, the first optical module movably retained in the first housing, the second optical module immovably retained in the second housing along a mating direction of the receptacle connector, the first and the second optical modules having lenses exposed to the corresponding first and second mating ports, respectively.

According to another aspect of the present invention, an adapter comprises: a plug connector comprising a first housing and a plurality of first terminals coupled to the first housing, the first housing having a first mating port, a depression, and a tongue portion located between the first mating port and the depression in an upper-to-lower direction, both of the first mating port and the depression being exposed to an exterior, the first terminals having contacting portions extending into the depression for electrical signal transmission; a receptacle connector being interconvertible with the first plug connector and comprising a second housing, and plurality of second terminals disposed in the second housing, the second housing defining a second mating port exposed to the exterior, the second terminals having contacting portions extending into the second mating port for electrical signal transmission; and an optical device comprising a first optical module being received in the depression of the first housing for optical signal transmission, and a second optical module being disposed on the second housing and exposed to the second mating port for optical signal transmission, the first optical module optically connecting to second optical module.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENT

In the following description, numerous specific details are set forth to provide a thorough understanding of the present invention. However, it will be obvious to those skilled in the art that the present invention may be practiced without such specific details.

Referring to FIGS. 1-6, an adapter 100 according to an embodiment of the present invention has one end being a DiiVA (Digital Interactive Interface for Video & Audio) plug connector, and an opposite end being a RJ type modular receptacle connector. The adapter 100 includes a first housing 1, a second housing 2 spaced away from the first housing 1 in a front-to-back direction thereof, a terminal module 3 retained in the first housing 1, an optical device 4, a PCB (printed circuit board) 5, a metallic latch 6 retained in the first housing 1, a metallic inner shell 7, a metallic outer shell 8 enclosing the first housing 1, the second housing 2 and the inner shell 7, and an external case 9 surrounding the outer shell 8. The plug connector is at least composed of the first housing 1, the terminal module 3, and the inner shell 7. The receptacle connector is composed of the second housing 2 and a plurality of terminals 26 insert molded in the second housing 2.

The first housing 1 includes a main portion 10, and a pair of mounting arms 12 extending rearwardly from two lateral sides of the main portion 10. A pair of positioning holes 121 are recessed forwardly from a rear face of the corresponding mounting arms 12 for retaining the metallic latch 6. A pair of longitudinal slots 101 are defined at two lateral sides of the main portion 10. The main portion 10 has a mounting space 102 recessed rearwardly from a top thereof, and a first mating port 104 extending forwardly from the mounting space 102 for receiving a mating connector (not shown). The main portion 10 has a depression 105 opposited to the first mating port 104 from a bottom thereof, a tongue portion 107 between the first mating port 104 and the depression 105, and a pair of positioning slots 103 extending rearwardly from the depression 105. A stopping portion 1051 disposed in a front segment of the depression 105. Two grooves 106 are defined in the bottom of the main portion 10 and extend rearwardly from the depression 105 and through the main portion 10. Two fixing slots 1052 respectively located at two outside of the depression 105.

The second housing 2 has a rear second mating port 22 for receiving a RJ type plug connector, a retaining cavity 23 extending forwardly from the second mating port 22 to pass therethrough in the front-to-back direction, and a sinking portion 20 formed at a front side thereof. The sinking portion 20 has a recess 28 recessed on a bottom thereof. The second housing 2 has a cutout 24 under the recesses 28 and communicated with the retaining cavity 23 along the front-to-back direction. The sinking portion 20 defines a pair of retaining posts 25 protruding downwardly into the cutout 24 therefrom. The retaining cavity 23 has a top inner wall defining a pair of guiding slots 232 passing therethrough, and a bottom inner wall defining a pair of locating slots 233. The guiding slots 232 are staggered with the locating slots 233 in an upper-to-lower direction of the adapter 100. The terminals 26 include contact portions 261 extending into the second mating port 22, and tail portions 262 disposed in the recesses 28.

Figure 5:
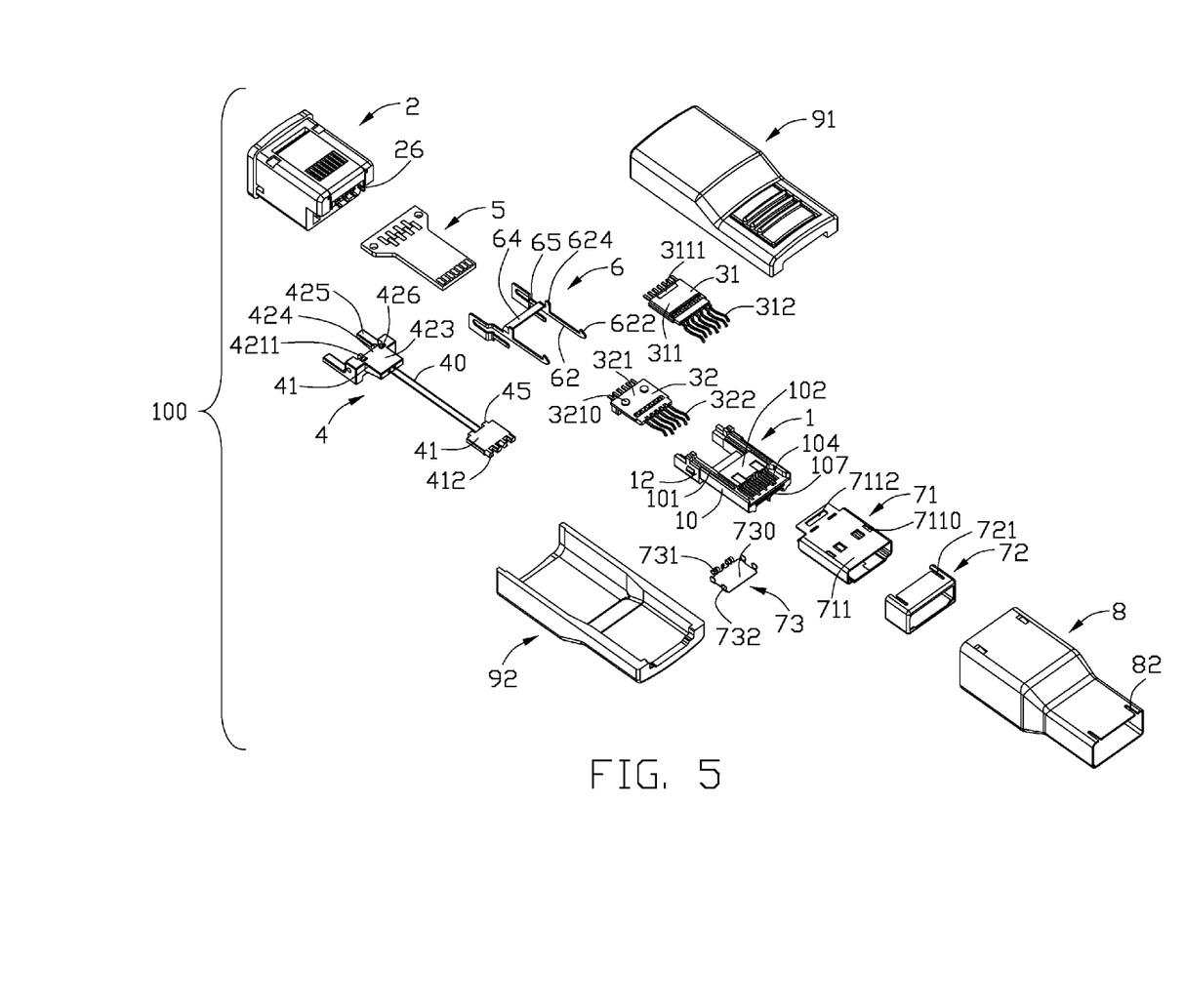
FIG. 5 is an exploded view of the adapter shown in FIG. 1.
Figure 6:
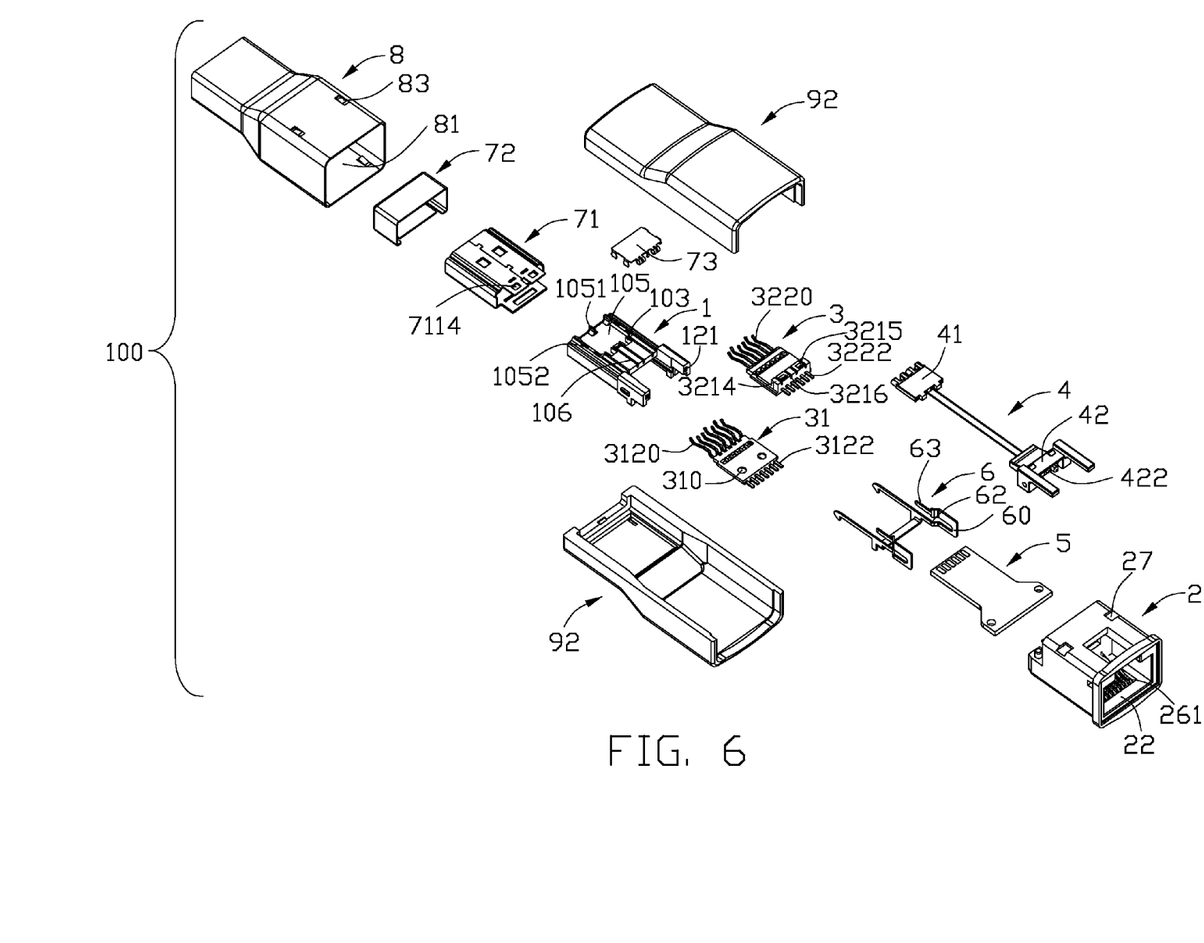
FIG. 6 is similar to FIG. 5, but viewed from another aspect.

The terminal module 3 includes a first terminal module 31 and a second terminal module 32 assembled together. The first terminal module 31 has a first insulator 311 and a plurality of first terminals 312 combined together by insert-molding process. The first terminals 312 are divided into signal terminals and grounding terminals configured to be longer than the signal terminals. The first terminals 312 have first contacting portions 3120 disposed in front of the first insulator 311 and first tail portions 3122 extending backwardly beyond the first insulator 311. Two mounting holes 3110 are defined in a bottom side of the first insulator 311. A protruding portion 3111 is formed on a top side of the first insulator 311.

The second terminal module 32 has a second insulator 321 and a plurality of second terminals 322 combined together by insert-molding process. The second terminals 322 are divided into signal terminals and grounding terminals configured to be longer than the signal terminals. The first and second terminals 312, 322 are combined together to adapt for the DiiVA protocol. The second terminals 322 have second contacting portions 3220 disposed in front of an edge of the second insulator 321 and second tail portions 3222 extending backwardly beyond the second insulator 321. Two mounting posts 3210 are formed on a top side of the second insulator 321. There is a transversal flange 3214 formed on a bottom side of a rear segment of the second insulator 321. In addition, there are two passageways 3216 defined in the transversal flange 3214 and extending along the front-to-back direction. There are also two protruding tabs 3215 formed on the transversal flange 3214. The first terminal module 31 and the second terminal module 32 are assembled together, with the first and second contacting portions 3120, 3220 merged into one row, while the first and second tail portions 3122, 3222 separated into two distinct rows along the upper-to-lower direction. The mounting posts 3210 are inserted into the mounting holes 3110 so as to keep the first terminal module 31 and the second terminal module 32 together. The first terminal module 31 and the second terminal module 32 are assembled to the insulative housing 1, with front segments of the first and second insulators 311, 321 inserted into the mounting space 102, rear segments of the insulators 311, 321 disposed between the two mounting arms 12, the first and second contacting portions 3120, 3220 extending into the first mating port 104 for contacting the mating connector.

The metallic latch 6 includes a pair of latching plates 65 spaced apart from each other along a transverse direction perpendicular to the front-to-back direction, and a connecting bridge 64 therebetween. Each latching plate 65 includes a connecting portion 60, a latching arm 62, a retention portion 63, a hook 622 disposed at a front end of the latching arm 62, and a pressing tab 624 protruding upwardly from a top side of the latching arm 62. The pressing tab 624 is behind the hook 622 and adjacent to the connecting bridge 64. The retention portions 63 are inserted into positioning holes 121 of the corresponding mounting arms 12, and the latching arms 62 are received in the slots 101 of the insulative housing 1.

The inner shell 7 includes a first inner shell 71, a second inner shell 72 and a metallic cap 73. The first inner shell 71 includes a frame 711 accommodating the main portion 10 therein. Two through holes 7110 are defined in a front segment of a top wall of the frame 711 to allow hooks 622 of the metallic latch 6 to pass through. A positioning hole 7112 is defined in a rear end of the top wall to latch with the protruding portion 3111 of the first terminal module 31. Two positioning holes 7114 are defined in a rear end of a bottom wall of the frame 711 to latch with the protruding tabs 3215 of the second terminal module 22.

The second inner shell 72 surrounds a rear segment of the first inner shell 71 and has a pair of slits 721 formed at a top side thereof for the pressing tabs 624 passing through. The metallic cap 73 has a planar body 730, two cylindrical shaped first retainers 731 formed at a back side of the planar body 730, and a plurality of second retainers 732 formed at opposite sides of the planar body 730. The first retainers 731 are received in the positioning slots 103 of the first housing 1. The second retainers 732 are retained in the fixing slots 1052.

The PCB 5 has a rear end defining a pair of retaining holes 51 retaining the retaining posts 25 therein. The rear end is received in the cutout 24. The tail portions 262 of the terminals 26 are soldered on an upper surface of the rear end of the PCB 5. The first tail portions 3122 of the first terminal module 31 are soldered with golden fingers arranged on a lower surface of a front end of the PCB. The second tail portions 3222 of the second terminal module 32 are soldered with golden fingers arranged on an upper surface of the front end of the PCB 5. Thus, the first and the second terminals 312, 322, electrically connect to the terminals 26 by the PCB 5.

The optical device 4 comprises a first optical module 41 disposed on the DiiVA plug connector, a second optical module 42 disposed on the RJ type modular receptacle connector, and two optical fibers 40 optically connecting the first and second optical modules 41, 42. The first optical module 41 includes a number of first lenses 412, and a first seat 411 holding the first lenses 412. The first lenses 412 are arranged in a row along the transversal direction and embedded in the first seat 411. The first optical module 41 is assembled to the depression 105 of the first housing 1. The first seat 411 of the first optical module 41 is stopped by the stopping portion 1051 located between the lenses 412. The first and second contacting portions 3120, 3220 and the first optical module 41 are separated by the tongue portion 107 in the upper-to-lower direction. The first lenses 412 are located in a front of the first and second contacting portions 3120, 3220. The metallic cap 73 is assembled to the first housing 1, with the planar body 730 mounted to and shielding the first optical module 41, and the first retainers 731 accommodated in the positioning slots 103 and pressing against back edges of the first seat 411. The second retainers 732 are sandwiched between lateral sides of the first seat 411 and inner lateral sides of the depression 105. In addition, the metallic cap 73 is accommodated in the frame 711, and sandwiched between the first housing 1 and the bottom wall of the frame 711. The optical fibers 40 are respectively coupled to the first lenses 412 and pass through the grooves 106 of the first housing 1 and the passageways 3216 of the second terminal module 32.

The second optical module 42 is immovably retained in the second housing 2, and includes a pair of second lenses 422 and a second seat 421 holding the second lenses 422. The second lenses 422 are arranged in a row along the transversal direction and embedded in the second seat 421. The second seat 421 is rearwardly retained in the retaining cavity 23. The second seat 421 has a base portion 424, a pair of guiding arms 425 located at two lateral sides of the base portion 424, and a middle protruding panel 423 protruding forwardly from the base portion 424. The guiding arms 425 protrude rearwardly beyond the base potion 424. The base portion 424 has a pair of columniation 4211 located at two lateral sides of the second lenses 422. A pair of locating blocks 426 are disposed a top of the base portions 424 and corresponding to the locating slots 233 of the second housing 2. The first lenses 412 optically connect to the second lenses 422 by the optical fibers 40.

The first optical module 41 is movably retained in the depression 105 of the first housing 1 in the front-to-back direction. The first lenses 412 are located in front of the first and the second contacting portions 3120, 3220. The planar body 730 of the metallic cap 73 is mounted to the first housing 1 and shields the first optical module 41. The first retainers 731 press against rear end of the first seat 411. The optical fibers 40 are respectively coupled to the first lenses 412 and pass rearwardly through the grooves 106 of the housing 1.

While the second optical module 42 is being assembled in the second housing 2. The guiding slots 232 of the second housing 2 guide the guiding arms 425 to move rearwardly horizontally while the guiding arms 425 engage with the guiding slots 232 for retaining the second optical module 42 into the retaining cavity 23 conveniently. The second lenses 422 are exposed in the second mating port 22. The protruding panel 423 is located in the cutout 24 so that the rear end of the PCB 5 is sandwiched between the protruding panel 423 and the sinking portion 20 of the second housing 2 in the upper-to-lower direction. The locating blocks 426 engage with the locating slots 233 respectively for preventing the second optical module 42 from moving in the front-to-back direction.

Figure 1:
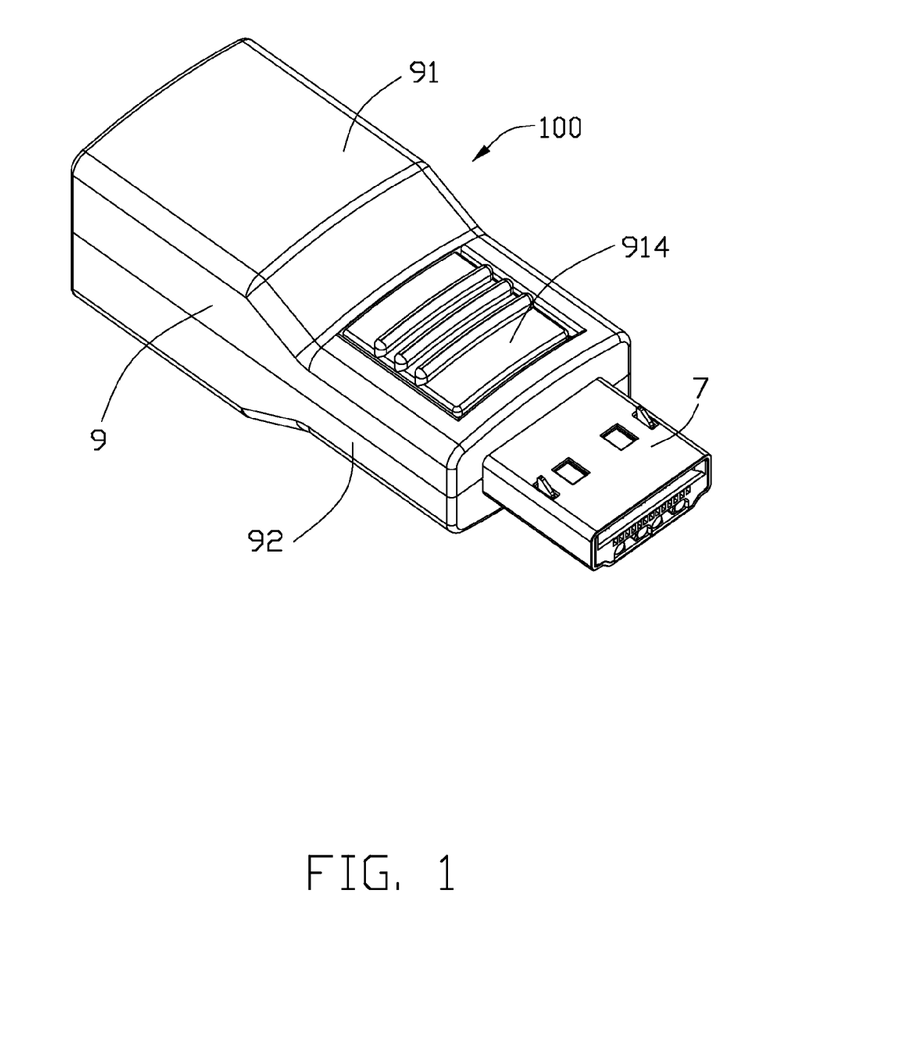
FIG. 1 is an assembled, perspective view of an adapter according to an embodiment of the present invention.
Figure 2:
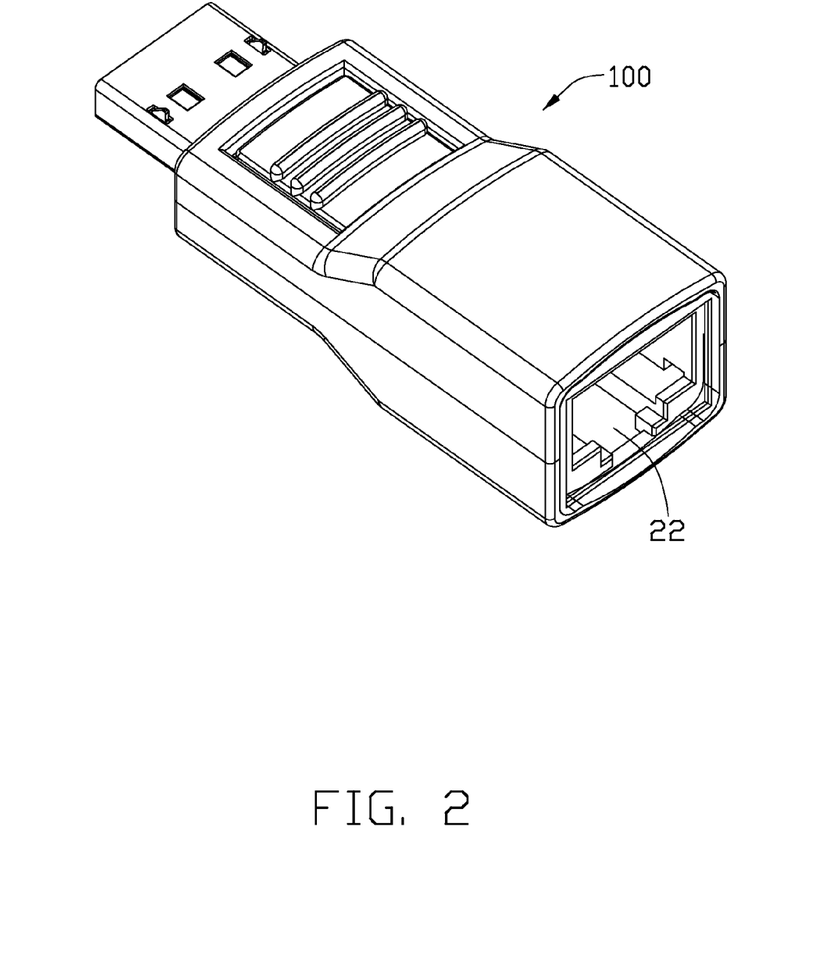
FIG. 2 is similar to FIG. 1, but viewed from another aspect.
Figure 3:
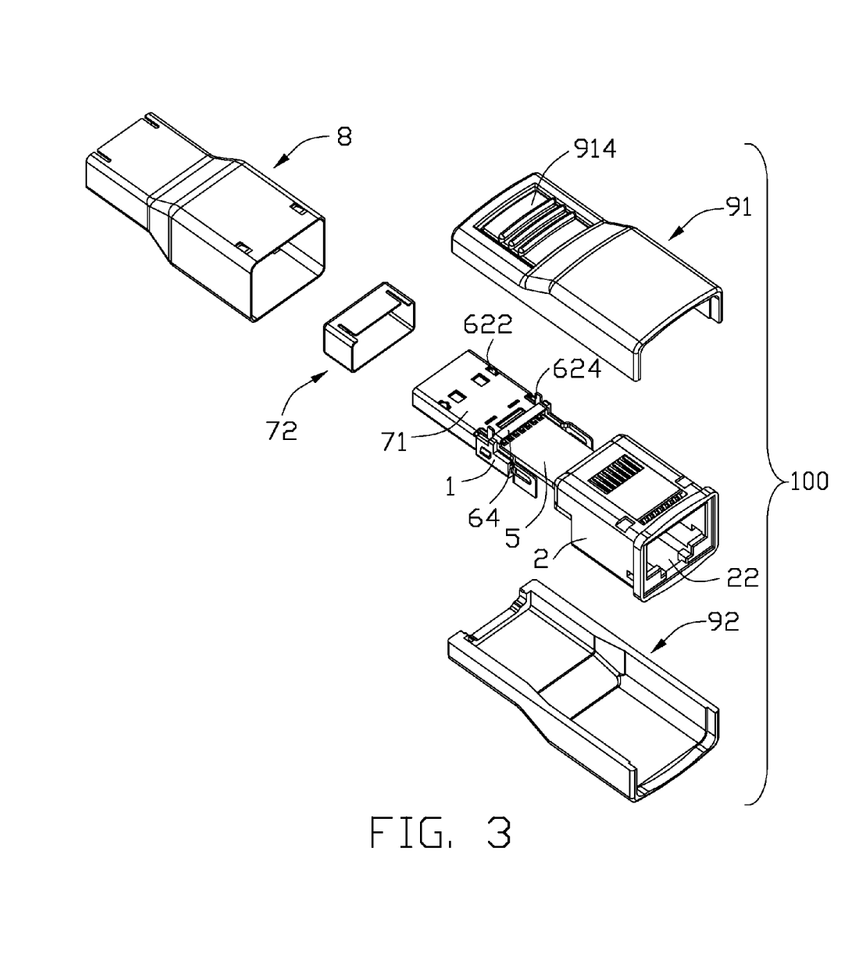
FIG. 3 is a partially exploded view of the adapter shown in FIG. 1.
Figure 4:
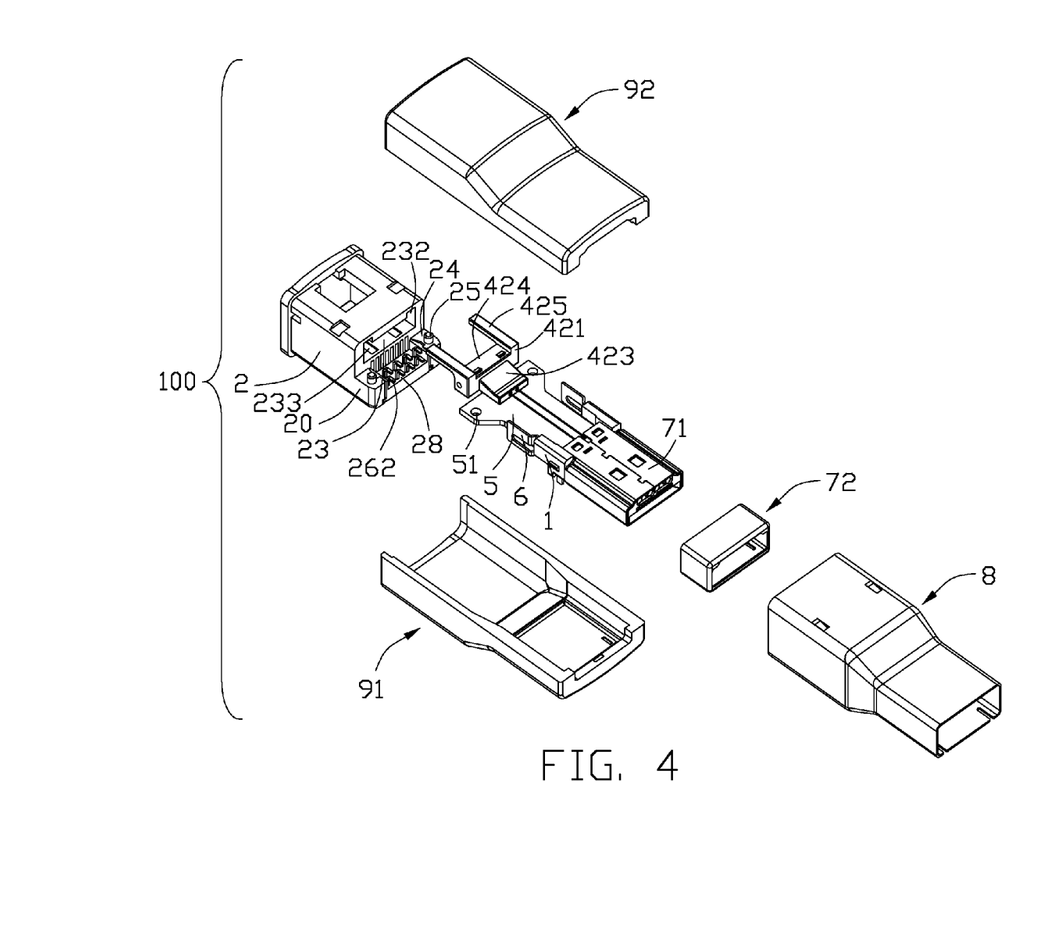
FIG. 4 is a further partially exploded view of the adapter shown in FIG. 3.

The outer shell 8 has a receiving space 81 surrounding the first and the second housing 1, 2. A front portion of the outer shell 8 has a pair of cuts 82 formed at a top side thereof and corresponding to the slits 721 of the second inner shell 72 for the pressing tabs 624 passing through. A rear portion of the outer shell 8 has a set of spring tabs 83 protruding inwardly from a top and bottom sides thereof and locking into notches 27 formed on a top and bottom sides of the second housing 2.

The external case 9 includes an upper cover 91 and a bottom cover 92 combined together in the upper-to-lower direction and surrounding the outer shell 8. A deformable button 914 is formed with the upper cover 91 and floatable along the upper-to-lower direction to drive the pressing tabs 624 of the latching arms 62 upwardly or downwardly so as to actuate the hooks 622 of the latching arms 62 to protrude out of or into the frame 711.

It is to be understood, however, that even though numerous, characteristics and advantages of the present invention have been set fourth in the foregoing description, together with details of the structure and function of the invention, the disclosed is illustrative only, and changes may be made in detail, especially in matters of number, shape, size, and arrangement of parts within the principles of the invention to the full extent indicated by the broad general meaning of the terms in which the appended claims are expressed.

What is claimed is:

1. An adapter comprising:
   a plug connector comprising a first housing defining a first mating port, and a plurality of first terminals disposed in the first housing;
   a receptacle connector comprising a second housing defining a second mating port, and a plurality of second terminals disposed in the second housing and electrically connecting to the first terminals, the second mating port defined at a rear end of the second housing, the second housing defining a retaining cavity extending forwardly from the second mating port, an inner wall of the retaining cavity has a pair of guiding slots; and
   an optical device comprising a first optical module and a second optical module optically connecting with each other via optical fibers, the first optical module movably retained in the first housing, the second optical module immovably retained in the second housing along a mating direction of the receptacle connector, the first and the second optical modules having lenses exposed to the corresponding first and second mating ports, respectively, the second housing has a pair of guiding arms engaging with the pair of guiding slots to retain the second optical module into the retaining cavity conveniently.

2. The adapter according to claim 1, wherein the first optical module has a first seat holding the corresponding lenses, the second optical module has a second seat holding the corresponding lenses.

3. The adapter according to claim 2, wherein the pair of guiding arms are located two at lateral sides of a bottom of the second seat and extend rearwardly beyond the second seat, respectively.

4. The adapter according to claim 2, wherein at least one inner wall of the retaining cavity has a locating slot locking with a locating block of the second seat for preventing the second seat from moving along the mating direction.

5. The adapter according to claim 1, wherein the first housing is spaced apart from the second housing, the first housing has a depression, and a tongue between the first mating port and the depression in an upper-to-lower direction perpendicular to a mating direction of the plug connector, the first terminals have contacting portions exposed to the depression which is exposed to an exterior, the adapter includes a metallic inner shell surrounding the first mating port and the depression directly.

6. The adapter according to claim 2, further comprising a PCB (printed circuit board) located between the plug connector and the receptacle connector in condition that the first terminals electrically connect to the second terminals via the PCB, the plug connector, the receptacle connector and the PCB are received within a metallic outer shell as an assembly.

7. The adapter according to claim 6, wherein the first terminals have tail portions arranged in two rows in the upper-to-lower direction and mounted onto two opposite surfaces of a front end of the PCB to sandwich the printed circuit board therebetween.

8. The adapter according to claim 6, wherein the second housing has a sinking portion protruding forwardly therefrom, and a cutout under the sinking portion, the second seat has a protruding panel protruding forwardly into the cutout and engaging with the sinking portion to sandwich a rear end of the PCB therebetween in the upper-to-lower direction, the second terminals have tail portions soldered onto an upper surface of the rear end of the PCB.

9. An adapter comprising:
   a plug connector comprising a first housing and a plurality of first terminals coupled to the first housing, the first housing having a first mating port, a depression, and a tongue portion located between the first mating port and the depression in an upper-to-lower direction, both of the first mating port and the depression being exposed to an exterior, the first terminals having contacting portions extending into the depression for electrical signal transmission;

a receptacle connector being interconvertible with the first plug connector and comprising a second housing, and a plurality of second terminals disposed in the second housing, the second housing defining a second mating port exposed to the exterior, the second terminals having contacting portions extending into the second mating port for electrical signal transmission;

a PCB (printed circuit board) located between the plug connector and the receptacle connector, the first terminals and the second terminals are electrically connected to each other via the PCB; and an optical device comprising a first optical module being received in the depression of the first housing for optical signal transmission, and a second optical module being disposed on the second housing and exposed to the second mating port for optical signal transmission, the second optical module has a plurality of lenses exposed to the second mating port, the second module has a seat holding the lenses and having a base portion, and a protruding panel extending forwardly therefrom, the second housing has a sinking portion parallel to the protruding panel to sandwich the PCB together with the protruding panel, the guiding arm extends rearwardly from the base portion, the first optical module optically connecting to second optical module.

10. The adapter according to claim 9, wherein the first optical modules has a plurality of lenses exposed to the first mating ports, the optical device has a plurality of optical fibers optically located between the plug connector and the receptacle connector and connecting the lenses, the plug connector, the receptacle connector and the optical device are received within a metallic shell as a sub-assembly.

11. The adapter according to claim 9, further comprising a metallic latch retained on the first housing, a metallic outer shell surrounding the first housing, and an external case surrounding the outer shell, the metallic latch includes a pair of latching plates spaced apart from each other along a transverse direction perpendicular to a mating direction of the plug connector, and a connecting bridge located therebetween, wherein a front end of the PCB is sandwich between the connecting bridge and the first housing, the latching plates each has a latching arm, a pressing tab protruding upwardly from the latching arm, and a hook disposed on a distal end of the latching arm, the external case has a deformable button floatable along the upper-to-lower direction to drive the pressing tab upwardly or downwardly so as to actuate the hook to protrude out of or into the plug connector.

12. An adapter comprising:

a case defining opposite first and second openings at opposite first and second ends thereof to respectively communicate with an exterior in opposite first and second directions;

a first connector unit disposed in the first opening and communicating with the exterior in the first direction, said first connector including a plurality of first contacts and a first optical lens unit;

a second connector unit disposed in the second opening and communicating with the exterior in the second direction, said second connector including a plurality of second contacts and a second optical lens unit;

a rigid printed circuit board located between the first connector unit and the second connector unit and mechanically and electrically connected to the corresponding first contacts and second contacts; and an optical fiber assembly connecting the first optical lens unit and the second optical lens unit without optical involvement with the rigid printed circuit board; wherein the first optical unit and the second optical unit are optically connected to each other via corresponding flexible optical fibers which are commonly located by a same surface of the rigid printed circuit board while the first connector unit and the second connector unit are dimensioned differently in both height and width directions which are both perpendicular to said opposite first and second directions.

13. The adapter as claimed in claim 12, wherein the printed circuit board defines two different widths at two opposite ends in said opposite first and second directions to comply with the differently dimensioned first and second connector units in the width direction.

14. The adapter as claimed in claim 13, wherein the first connector unit is dimensioned larger than the second connector unit in the width direction, and the second connector unit is equipped with a metallic latch while the first connector unit is not.

15. The adapter as claimed in claim 14, wherein the second connector unit defines a retaining cavity, an inner wall of the retaining cavity has a pair of guiding slots, and the second optical lens unit has a pair of guiding arms engaging with the pair of guiding slots to retain the second optical unit into the retaining cavity conveniently.

* * * * *